United States Patent [19]
Glück et al.

[11] Patent Number: 5,880,166
[45] Date of Patent: Mar. 9, 1999

[54] EXPANDABLE STYRENE POLYMERS

[75] Inventors: Guiscard Glück, Mainz; Klaus Hahn, Kirchheim; Rolf Henn, Oftersheim; Karl-Heinz Wassmer; Hermann Gausepohl, both of Mutterstadt; Konrad Knoll, Ludwigshafen; Karl-Heinz Batscheider, Mutterstadt, all of Germany

[73] Assignee: BASF Aktiengesellschaft, Ludwigshafen, Germany

[21] Appl. No.: 58,899

[22] Filed: Apr. 13, 1998

[30] Foreign Application Priority Data

Apr. 19, 1997 [DE] Germany .................. 197 16 572.9

[51] Int. Cl.$^6$ ....................................... C08J 9/16
[52] U.S. Cl. ................. 521/59; 521/53; 521/54; 521/149
[58] Field of Search ................ 521/59, 149, 53, 521/54

[56] References Cited

U.S. PATENT DOCUMENTS 5,525,639  6/1996  Keneko et al. ..................... 521/54

OTHER PUBLICATIONS

Derwent Abstracts, Accession No. 96–040881/05, DE 4,42, 952, Dec. 21, 1995.

*Primary Examiner*—Morton Foelak
*Attorney, Agent, or Firm*—Oblon, Spivak, McClelland, Maier & Neustadt, P.C.

[57] ABSTRACT

Expandable, rubber-modified styrene polymers for elastic polystyrene foams comprise a) a continuous phase comprising polystyrene or a styrene copolymer containing at most 50% of copolymerized comonomers and b) from 5 to 30% by weight of a butadiene-styrene block copolymer dispersed therein, and also a low-boiling blowing agent. The rubber particles have a compact lamellar structure without polystyrene inclusions. The expandable styrene polymers are prepared by polymerization of styrene in the presence of the block copolymer and impregnation with the blowing agent.

7 Claims, 1 Drawing Sheet

EXPANDABLE STYRENE POLYMERS

FIELD OF THE INVENTION

The present invention relates to expandable styrene polymers which are suitable for producing elastic foams.

BACKGROUND OF THE INVENTION

Foams based on expandable polystyrene particles have achieved great industrial importance as thermal insulation and packaging material. They are produced on an industrial scale by first preparing expandable styrene polymers by suspension polymerization of styrene in the presence of a blowing agent, foaming these by heating to form foam particles and subsequently welding the latter together in molds to produce shaped articles.

Polystyrene foams are rigid foams. Their low elasticity is a disadvantage for many applications, for example in the packaging sector, since the packaged goods can be only insufficiently protected against impact and shock and the foam moldings used as packaging material break at only a small deformation.

Attempts have therefore already been made in the past to increase the elasticity of polystyrene foams.

WO 94/25516 relates to prefoamed beads of rubber-modified styrene polymers having cell walls comprising a polymer matrix comprising a) a continuous polystyrene phase and b) flat rubber particles having a l':d' ratio of from 10:1 to 70:1 dispersed therein, where the individual particles have a rubber shell in which one or more polystyrene cores are enclosed. To prepare these prefoamed beads, polybutadiene or a polystyrene-polybutadiene two-block copolymer is dissolved in styrene and the styrene is polymerized. This gives a rubber-modified styrene polymer containing rubber particles which have a diameter of from 0.1 to 1 μm and in which the core-shell structure is preformed. This rubber-modified styrene polymer is impregnated with blowing agent and granulated, and the beads containing blowing agent are foamed. However, the toughness of foams made up in this way still leaves something to be desired; in particular, the elastic recovery is unsatisfactory.

SUMMARY OF THE INVENTION

It is an object of the present invention to provide further expandable rubber-modified styrene polymers which display excellent elastic recovery.

We have found that this object is achieved by an expandable, rubber-modified styrene polymer comprising
 a) a continuous phase comprising polystyrene or a styrene copolymer containing up to 50% of comonomers and
 b) from 5 to 30% by weight, based on the polymer mixture, of rubber particles dispersed therein,
and also from 2 to 15 parts by weight, based on 100 parts by weight of the polymer mixture, of a low-boiling blowing agent, wherein the rubber particles comprise a butadiene/styrene block copolymer and have a compact lamellar structure without polystyrene inclusions. The ratio of the mean length l of these rubber particles to their mean thickness d is preferably greater than 5:1.

The present invention further provides a process for preparing the expandable, rubber-modified styrene polymers, which comprises dissolving the block copolymer in styrene and, if desired, the comonomers, polymerizing the monomers and converting the polymer into granule form, with a low-boiling blowing agent being added during or after the polymerization.

The present invention also provides prefoamed beads comprising rubber-modified styrene polymers and having cell walls comprising a polymer mixture which comprises
 a) a continuous phase comprising polystyrene or a styrene copolymer containing up to 50% of comonomers and
 b) from 5 to 30% by weight, based on the polymer mixture, of rubber particles having a lamellar structure dispersed therein, wherein the rubber particles comprise a butadiene-styrene block copolymer and have a compact lamellar structure without polystyrene inclusions. The ratio of the mean length l' of the rubber particles to their mean thickness d' is preferably greater than 80:1.

DETAILED DESCRIPTION OF THE INVENTION

Figure 1:
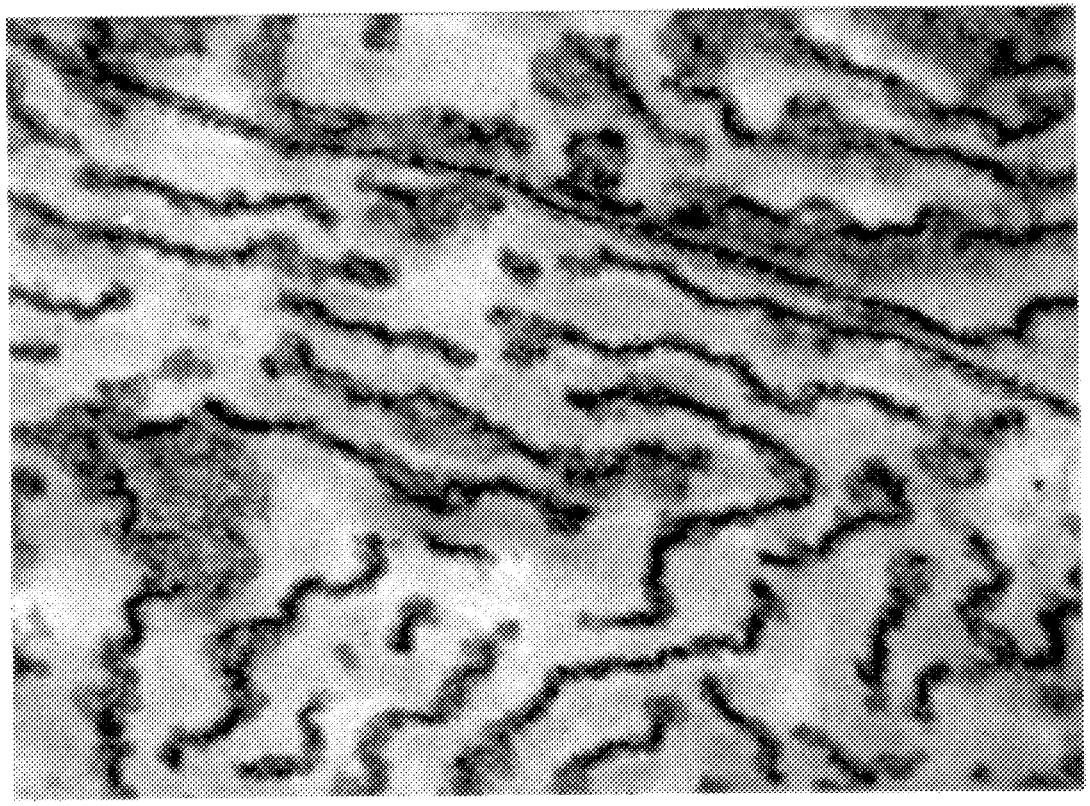
FIG. 1 is an electron micrograph of an unfoamed bead of the invention.

Foams which are produced from such prefoamed beads have a good solvent resistance and a high elasticity, in particular an excellent resilience. This is surprising because according to WO 94/25516 the ability of the rubber particles to suppress crack formation is lost at a l':d' ratio of greater than 70:1.

The expandable styrene polymers comprise, in the polymer matrix, from 70 to 95% by weight, preferably from 85 to 93% by weight, of polystyrene or a styrene copolymer containing up to 50% by weight, preferably up to 80% by weight, of copolymerized comonomers. Suitable comonomers are, for example, α-methylstyrene, ring-halogenated styrenes, ring-alkylated styrenes, acrylonitrile, esters of acrylic or methacrylic acid and alcohols having from 1 to 8 carbon atoms, N-vinylcarbazole and maleic acid (anhydride). The polystyrene advantageously contains a small amount of a copolymerized crosslinker, ie. a compound having more than one, preferably 2, double bonds, for example divinylbenzene, butadiene or butanediol diacrylate. The crosslinker is generally used in amounts of from 0.005 to 0.05 mol %, based on styrene. In contrast to the block copolymers described below, these are random copolymers.

The expandable styrene polymers contain, in the polymer mixture, from 5 to 30% by weight, preferably from 8 to 25% by weight, of a butadiene-styrene block copolymer in the form of particles dispersed in the polystyrene phase. Preference is given to block copolymers which have the block structure S-B/S(-S)$_n$ where S is a polystyrene block, B/S is a butadiene-styrene copolymer block having a random distribution of the monomers, n is either 0 or 1 and the blocks S together make up from 5 to 40% by volume.

Suitable block copolymers of the structure S-B/S(-S)$_n$ are described in WO 95/35335. It is essential here that the monomers are randomly distributed in the B/S block. The structure within this block can be, based on the statistical mean, homogeneous or inhomogeneous along the chain. Such block copolymers can be prepared by anionic polymerization of the monomers in a nonpolar solvent which contains from 0.1 to 5% by weight of a polar cosolvent. Details regarding suitable initiators, coupling agents, solvents, cosolvents and further conditions of the multistage polymerization are comprehensively described in WO 95/35335.

The proportion by volume of the soft phase consisting of the B/S block in the solid is of decisive importance to the mechanical properties. According to the present invention, the proportion by volume of the soft phase is 60–95% by volume, preferably 70–90% by volume and particularly preferably 80–90% by volume. The polystyrene blocks S form the hard phase whose proportion by volume is correspondingly 5–40% by volume, preferably 10–30% by volume and particularly preferably 10–20% by volume.

The proportion by volume of the two phases can be measured by means of contrasted electron microscopy or solid-state NMR spectroscopy. The proportion of the polystyrene blocks can be determined by osmium degradation of the polybutadiene component and subsequent precipitation and weighing. The future phase ratio of a polymer can also be calculated from the amounts of monomers used if polymerization is allowed to proceed to completion each time. In the range being considered here, the percentages by weight of styrene in butadiene correspond approximately to the percentages by volume.

For the purposes of the present invention, the block copolymer is unambiguously defined by the quotient of the proportion by volume in percent of the soft phase formed by the B/S blocks and the proportion of butadiene units in the overall block copolymer, which for the combination of styrene/butadiene is preferably from 25 to 70% by weight.

The random incorporation of styrene units into the soft block of the block copolymer and the use of cosolvents during the polymerization influence the glass transition temperature ($T_g$). A glass transition temperature of from −50° to +25° C., preferably from −50° to +5° C., is typical.

The molecular weight of the block S is generally from 1000 to 200,000, preferably from 3000 to 80,000 [g/mol]. Within a molecule, S blocks can have different molar masses.

The molecular weight of the block B/S is usually from 2000 to 250,000 [g/mol], preferably from 5000 to 150,000 [g/mol].

The block copolymer is dispersed in the continuous phase in the form of particles which have a compact lamellar structure without polystyrene inclusions. FIG. 1 shows an electron micrograph of a thin section of an unfoamed-bead (magnification 1:40,000), in which the lamellar structure of the dark rubber phase can clearly be seen. It is conspicuous that in addition to many very long bands or strips there are also some shorter segments. The ratio of the mean lengths to the mean thickness of the lamellae is preferably greater than 5:1, in particular greater than 10:1.

Apart from the above-described block copolymer of the structure S-B/S (-S)$_n$, the polymer mixture can also contain small amounts of other rubbers and block copolymers having a different type of structure.

The expandable styrene polymers contain from 2 to 15 parts by weight, preferably from 3 to 10 parts by weight, based on the polymer mixture, of a low-boiling blowing agent. The blowing agents should not dissolve the polystyrene, but be soluble in polystyrene. The boiling point should be below the softening point of the polystyrene. Suitable blowing agents are, for example, propane, butane, pentane, hexane, cyclopentane, cyclohexane, octane, dichlorodifluoromethane, trifluorochloromethane and 1,1,1-difluorochloroethane. Preference is given to using pentane.

The expandable styrene polymers can further comprise customary additives in effective amounts, for example dyes, fillers, stabilizers, flame retardants, synergists, nucleating agents, lubricants, antistatic agents substances which prevent sticking during foaming, agents for shortening the demolding time after foaming, and also carbon black or graphite for reducing the thermal conductivity of the foams.

Other suitable additives are poly(2,6-dimethyl)-1,4-phenylene ether and poly-1,4-phenylene sulfide. Amounts of from 1 to 20 parts by weight, based on 100 parts by weight of the polymer mixture, of these additives increase the heat distortion resistance of the foam.

The expandable styrene polymers are preferably prepared by dissolving the block copolymer in styrene and, if desired, the comonomers, polymerizing the monomers and converting the polymer into granule form, with a low-boiling blowing agent being added during or after the polymerization.

The polymerization can be carried out by known methods in bulk, in solution or in aqueous suspension. It is also possible to carry out a prepolymerization in bulk first and to complete the polymerization in suspension. In the suspension polymerization, the blowing agent can be added directly so that granules containing blowing agent are obtained without an intermediate stage. However, the rubber-modified styrene polymer can also be impregnated with the blowing agent after polymerization, in which case impregnation in aqueous suspension is preferred.

The expandable styrene polymers are then in the form of particles, ie. in bead or granule form, and advantageously have a mean diameter of from 0.1 to 6 mm, in particular from 0.4 to 3 mm.

During the polymerization of the styrene in the presence of the block copolymers containing double bonds, a grafting reaction of the styrene to the double bonds takes place, leading to partial crosslinking of the resulting polymers. The degree of crosslinking can be measured by dissolving the polymer in a suitable solvent, for example in styrene at 20° C., and weighing the residue. It has here been found that the proportion of insoluble material is greater than the proportion of rubber in the starting mixture before the polymerization.

The crosslinked material is naturally also present in the foams formed in the subsequent foaming process; there it effects the improved solvent resistance and high resilience.

To produce the prefoam beads, the expandable styrene polymers are expanded in a known manner by heating to temperatures above their softening point, for example using hot air or preferably using steam. The foam particles obtained can, after cooling and, if desired, after intermediate storage, be foamed further by being heated again.

Figure 2:
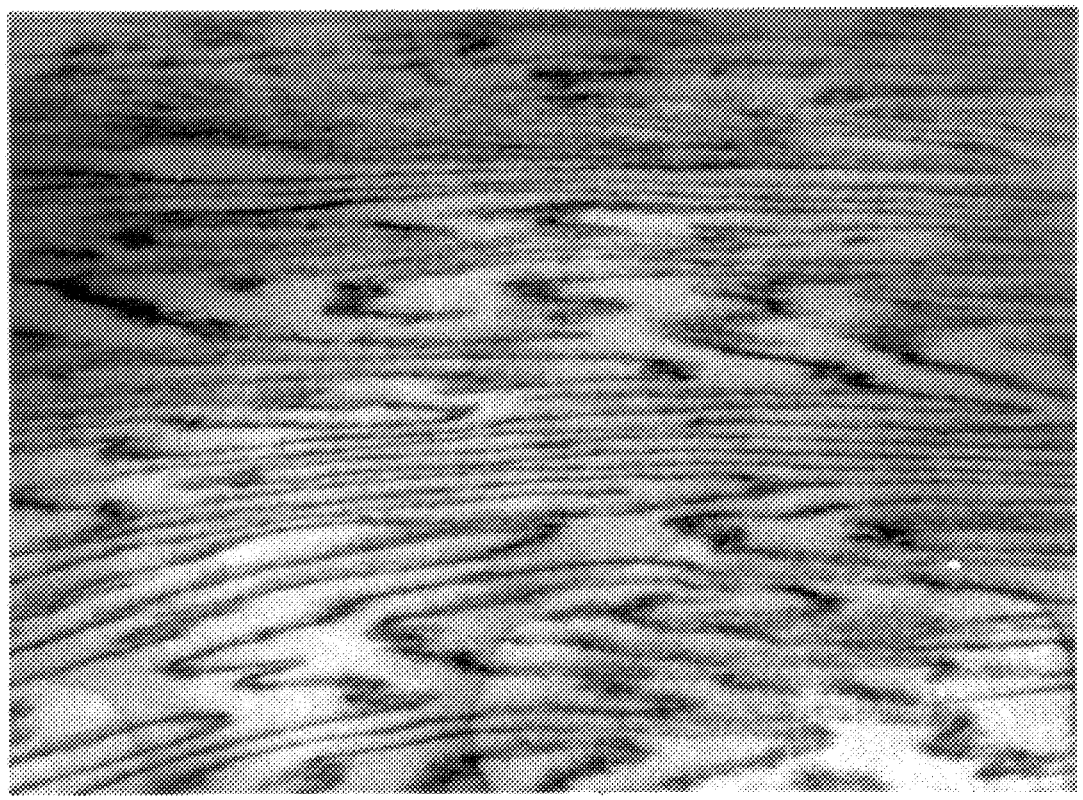
FIG. 2 is an electron micrograph of a foamed bead of the invention.

In the prefoamed beads, the cell walls again comprise the above-described polymer mixture, with the rubber lamellae being stretched in the longitudinal direction (preferably parallel to interfaces of the cell walls) as a result of the expansion of the cells and having a ratio of the mean length l' to the mean thickness d' of greater than 10:1, preferably greater than 80:1. FIG. 2 shows an electron micrograph of a thin section of a prefoamed bead (magnification 1:40.000).

To produce foams, the prefoamed beads are welded together in a known manner in molds which do not close in a gastight manner to form moldings.

The foams obtained have densities of from 5 to 150 g/cm$^3$, in particular from 10 to 100 g/cm$^3$.

The foams produced from the styrene polymers of the present invention have a high elasticity. Thus, the residual deformation after the foam has been compressed four times, measured in accordance with DIN 53 777, is not more than 15%. These polymers are therefore clearly superior to conventional, rubber-free styrene polymers. Furthermore, they also have a reduced thermal conductivity.

The prefoamed beads have a uniform cell structure and, during the molding process, weld together without formation of voids. The moldings thus produced have an excellent heat distortion resistance.

Furthermore, the foams produced according to the present invention provide surprisingly good thermal insulation which is up to 10% better than for conventional polystyrenes of the same density. The foams and moldings can be recycled without problems.

The invention is illustrated by the following examples in which parts and percentages are by weight unless otherwise specified.

EXAMPLE 1

3.2 kg (15%) of a butadiene-styrene block copolymer having the structure S-B/S-S with 26% by volume of polystyrene blocks (STYROFLEX from BASF AG) are dissolved in 16.0 kg (85%) of styrene, and 64.0 g of dicumyl peroxide, 19.2 g of dibenzyl peroxide and 9.6 g of dimeric α-methylstyrene are mixed in. The organic phase is introduced into 22.0 l of deionized water containing 78.8 g of sodium pyrophosphate and 146.1 g of magnesium sulfate in a 50 l stirred reactor. The suspension is heated to 80° C. and after 100 minutes 3.96 g of a secondary sodium alkanesulfonate (emulsifier K 30/40, Bayer AG) is added. After a further 95 minutes, 1536.0 g of pentane are added and polymerization is completed at 134° C.

Separating off the aqueous phase gives beads having a mean diameter of 1.0 mm. The beads can be foamed by means of steam to a density of 25.0 g/cm$^3$ after 3 minutes. The internal water content is about 1% and the residual styrene content is <1000 ppm.

The figures show electron micrographs of unfoamed (FIG. 1) and foamed (FIG. 2) beads. The lamellar structure of the dispersed rubber parties can clearly be seen and measurements show that the l:d ratio is greater than 10:1 in the unfoamed beads and greater than 100:1 in the foamed beads.

EXAMPLE 2

EXAMPLE 1 was repeated using 10% of block copolymers.

EXAMPLE 3

Example 1 was repeated using 20% of block copolymers.

We claim:

1. An expandable, rubber-modified styrene polymer comprising
   a) a continuous phase comprising polystyrene or a styrene copolymer containing up to 50% of comonomers and
   b) from 5 to 30% by weight, based on the polymer mixture, of rubber particles dispersed therein,
and also from 2 to 15 parts by weight, based on 100 parts by weight of the polymer mixture, of a low-boiling blowing agent, wherein the rubber particles comprise a butadiene/styrene block copolymer and substantially all have a compact lamellar structure without polystyrene inclusions.

2. An expandable styrene polymer as claimed in claim 1, wherein the ratio of the mean length l of the rubber particles to their mean thickness d is greater than 5:1.

3. An expandable styrene polymer as claimed in claim 1, wherein the block copolymer has the block structure S-B/S(-S)$_n$ where S is a polystyrene block, B/S is a butadiene-styrene copolymer block having a random distribution of the monomers, n is either 0 or 1 and the blocks S together make up from 5 to 40% by volume.

4. An expandable styrene polymer as claimed in claim 1, wherein the polymer mixture is partially crosslinked so that a proportion which is greater than the proportion of rubber in the polymer mixture is insoluble in styrene at 20° C.

5. Prefoamed beads comprising rubber-modified styrene polymers and having cell walls comprising a polymer mixture which comprises
   a) a continuous phase comprising polystyrene or a styrene copolymer containing up to 50% of comonomers and
   b) from 5 to 30% by weight, based on the polymer mixture, of rubber particles having a lamellar structure dispersed therein,
wherein the rubber particles comprise a butadiene-styrene block copolymer and have a compact lamellar structure without polystyrene inclusions.

6. Prefoamed beads as claimed in claim 5, wherein the ratio of the mean length l' of the rubber particles to their mean thickness d' is greater than 10:1.

7. Prefoamed beads as claimed in claim 5, wherein the block copolymer has the block structure S-B/S(-S)$_n$ where S is a polystyrene block, B/S is a butadiene-styrene copolymer block having a random distribution of the monomers, n is either 0 or 1 and the blocks S together make up from 5 to 40% by volume.

* * * * *